United States Patent [19]

Visek

[11] Patent Number: 4,499,869

[45] Date of Patent: Feb. 19, 1985

[54] RECIPROCATING INTERNAL COMBUSTION ENGINE

[75] Inventor: Tomas Visek, Steyr, Austria

[73] Assignee: Steyr-Daimler-Puch Aktiengesellschaft, Vienna, Austria

[21] Appl. No.: 578,202

[22] Filed: Feb. 8, 1984

[30] Foreign Application Priority Data

Feb. 10, 1983 [AT] Austria .................................. 454/83

[51] Int. Cl.³ .................................................. F02F 7/00
[52] U.S. Cl. .............................. 123/195 C; 123/195 S; 123/198 E
[58] Field of Search ............ 123/198 E, 195 C, 195 S; 181/204

[56] References Cited

U.S. PATENT DOCUMENTS

| | | | |
|---|---|---|---|
| 4,071,008 | 1/1978 | Skatsche et al. | 123/198 E |
| 4,230,087 | 10/1980 | Abe et al. | 123/198 E |
| 4,257,369 | 3/1981 | Abe et al. | 123/195 C |
| 4,287,861 | 9/1981 | Lettner et al. | 123/195 C |
| 4,313,405 | 2/1982 | Skatsche et al. | 123/195 C |
| 4,377,993 | 3/1983 | List | 123/195 C |

FOREIGN PATENT DOCUMENTS

| | | |
|---|---|---|
| 2849860 | of 0000 | Fed. Rep. of Germany . |
| 2920082 | of 0000 | Fed. Rep. of Germany . |
| 2801431 | of 0000 | Fed. Rep. of Germany . |
| 2850816 | 5/1979 | Fed. Rep. of Germany ... 123/198 E |
| 2431651 | 2/1980 | France .............................. 123/195 C |
| 47020 | 4/1979 | Japan ................................ 123/198 E |

*Primary Examiner*—Ira S. Lazarus
*Attorney, Agent, or Firm*—Karl F. Ross; Herbert Dubno

[57] ABSTRACT

The engine block of a reciprocating internal combustion engine comprises cylinders, cylinder heads, pistons, connecting rods, a crankshaft, and bearings for said parts. The engine block is mounted in an outer pan in such a manner that the pan is insulated against a transmission of structure-borne sound from the engine block. A frame-shaped flexible seal is disposed between the engine block and the top edge portion of the outer pan and surrounds the engine block. The oil seal extends into grooves which are formed in the top edge portion of the outer pan and in the engine block. To ensure that the oil seal will produce a perfect sealing action in spite of relative motion of the engine block and outer pan and that the oil seal will not render the assembling and disassembling of the engine more difficult, the oil seal consists of fins, which are force-fitted in the grooves, and a thin flexible profiled connecting portion, which connects the fins. The fins are provided on their side faces with a plurality of longitudinal ribs. The thickness of each fin, inclusive of the ribs, exceeds in an unstressed condition the width of the corresponding groove.

6 Claims, 5 Drawing Figures

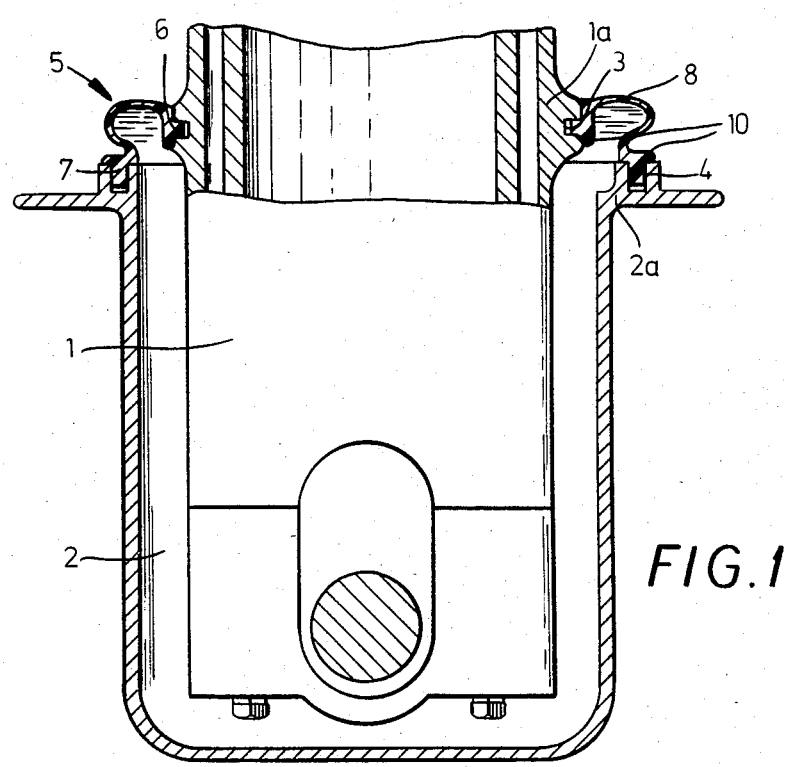
FIG.1
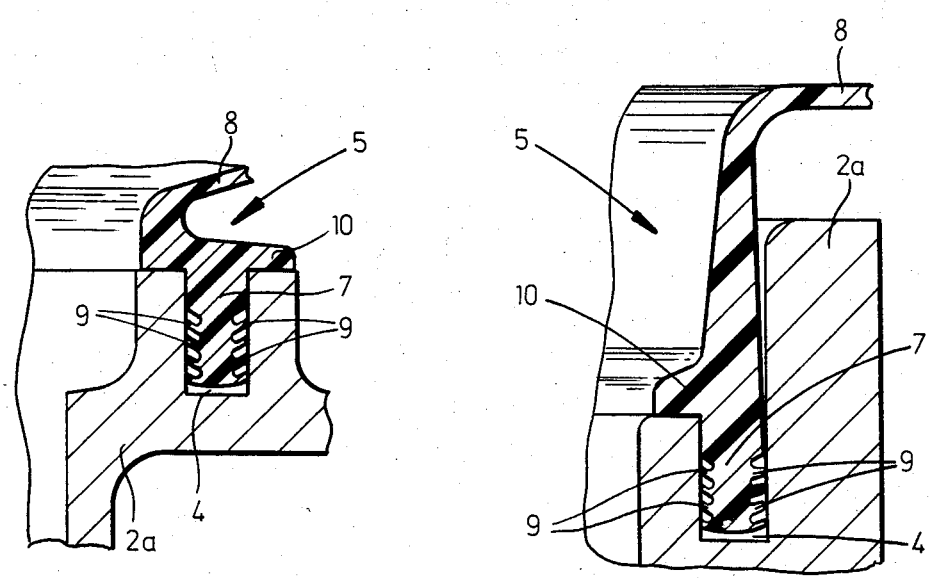
FIG.2
FIG.3

RECIPROCATING INTERNAL COMBUSTION ENGINE

This invention relates to a reciprocating internal combustion engine comprising an engine block, which includes cylinders, cylinder heads, pistons, connecting rods, a crankshaft, and bearings for the above-mentioned elements, and is mounted in an outer pan by means preventing a transmission of structure-borne sound. In that engine, a frame-shaped flexible oil seal is disposed between the engine block and the top edge portion of the outer pan and surrounds the engine block and extends into a groove formed in the top edge portion of the outer pan and into a groove formed in the engine block.

It is known from German Patent Publication No. 28 01 431 to provide such oil seal in the form of an inflatable tube. It has been found, however, that the internal pressure in the tube will decrease as a result of the ageing of its material so that the tube will gradually lose its sealing action. It is also known to use an oil seal consisting of a composition which has a high viscosity or is plastically deformable and capable of adhering to metal and to provide in the engine block or in the top edge portion of the outer pan a recess for accommodating said composition (Laid-open German Application No. 29 20 082). It is difficult to provide such an oil seal because a creeping of the sealing composition along one or the other of the adjoining parts into the space which is to be sealed in the outer pan can hardly be prevented. Besides, the proper function of the sealing composition cannot be ensured by adhesive contact alone and the parts to be sealed are so large that the sealing composition cannot be vulcanized where it contacts one or both of said parts. Moreover, such oil seal will have to be destroyed when the engine is to be disassembled.

It is also known to provide between the engine block and the top edge portion of the outer pan an elastic oil seal which does not transmit forces and extends into grooves provided in the top edge portion of the pan and in the engine block (Laid-open German Application No. 2,849,860). That publication does not disclose in detail how the seal engages in the grooves so as to ensure a permanent retention, and a perfect flexibility of the seal for adaptation to the inevitable relative motion of the engine block and pan is not ensured.

It is an object of the invention to eliminate these disadvantages and to provide a reciprocating internal combustion engine which is of the kind described first hereinbefore and in which the oil seal provided between the engine block and the outer pan will remain perfectly operative for long periods of time in spite of the relative motion of said two parts and the oil seal does not involve difficulties regarding the assembling and disassembling of the engine and does not adversely affect the insulation against structure-borne sound.

This object is accomplished in accordance with the invention in that the oil seal consists of fins, which are force-fitted into the grooves and a frame-shaped flexible profiled connecting portion, which connects said fins throughout the length thereof and has in cross-section an outwardly convex portion, which protrudes laterally outwardly above said top edge portion, each of said fins has side faces formed with a plurality of transversely deflectable, longitudinal ribs in sealing contact with said side faces of the associated one of said grooves, the thickness of each of said fins, inclusive of said ribs, in an unstressed condition exceeds the width of the associated groove, and the thickness of said flexible connecting portion is smaller than the thickness of each of said fins.

The desired sealing action is achieved because the fins are force-fitted in the grooves extending along the top edge portion of the pan whereas a permanent pressure force need not be applied by the seal to the respective part to be sealed. As the fins are forced into the grooves, the longitudinal ribs are elastically deformed to form barbs, by which the fins are retained in the groove so that a decrease of the sealing action need not be feared, particularly because the longitudinal ribs constitute labyrinth grands. As the two fins are connected by the flexible connecting portion and the same owing to its convex curvature has a width which is greatly in excess of the distance between the fins, the seal has the compliance which permits it to follow all relative movements occurring in operatin between the engine block and the outer pan and a detrimental ageing need not be feared.

To ensure that the fins can be more easily forced into the grooves, i.e., to facilitate the assembling work, the flexible connecting portion of the oil seal is provided with flanges, from which the fins extend. The falnges may serve as buffer stops in case of large vibratory excursions of the engine block.

The outer pan is, as a rule, a bipartite casting. To save costs, the groove in the top edge portion of the pan is not formed by machining the casting but is formed in the casting operation. In many cases the dimensions of the sections of the pan are not exactly identical so that when the sections of the pan are joined the adjacent groove portions can be aligned on one side whereas they are offset on the other side so that it will be difficult to force the oil seal into the grooves and the sealing action of the oil seal forced into the grooves will be adversely affected. For this reason the invention provides that when the outer pan is divided in a vertical plane and the groove portions are offset owing to manufacturing tolerances the sections of the pan are provided adjacent to the adjoining groove portions with respective recesses, by which the adjoining groove sections are enlarged in width and which combine to form a bore, which has an axis that is disposed in the parting plane between the sections of the pan and equally spaced from the center planes of the two adjacent groove portions, and to provide the corresponding fins of the oil seal with thickened cylindrical portions, which are preferably provided with ribs and force-fitted in said bores. In that arrangement the thickened fin portion disposed in the groove-enlarging bore acts like a hinge so that the offset of the groove portions will be bridged or compensated.

The invention is illustrated by way of example on the accompanying drawings, in which FIG. 1 is a diagrammatic fragmentary elevation showing a reciprocating internal combustion engine partly in vertical section, FIG. 2 shows a detail of FIG. 1 on an enlarged scale.

FIG. 3 is a view that is similar to FIG. 2 and illustrates a modification,

Figure 4:
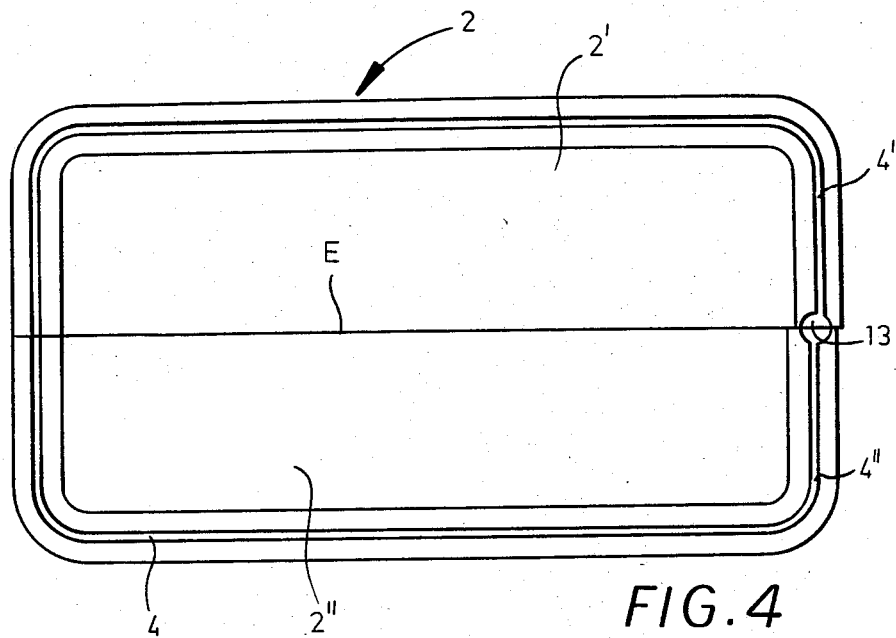
FIG. 4 is a top plan view showing a bipartite outer pan.

The reciprocating internal combustion engine according to the invention comprises an engine block 1, which comprises cylinders, cylinder heads, pistons, connecting rods, a crankshaft and bearings for said parts and is mounted in an outer pan 2 by means which insulate against structure-borne sound. Adjacent to the top edge portion of the outer pan 2, the wall 1a of the engine block 1 and the wall 2a of the outer pan 2 are formed with grooves 3 extending along the top edge of the pan. The engine block 1 is surrounded by a frame-shaped oil seal 5, which is disposed between the engine block 1 and the top edge portion of the outer pan 2. That oil seal 5 consists of fins 6, 7, which are force-fitted in the grooves 3, 4, respectively, and a flexible connecting portion 8 connecting the fins 6, 7. The flexible connecting portion is much thinner than the fins 6, 7, and has in cross-section an outwardly convex, outwardly protruding portion.

The fins 6, 7 have side faces formed with a plurality of transversely deflectable longitudinal ribs 9. When the oil seal 5 is unstressed, the thickness of each fin, inclusive of said longitudinal ribs 9, exceeds the width of the corresponding groove 3 or 4 so that when the fins 6, 7 are force-fitted in the grooves 3, 4 the longitudinal ribs 9 will engage the side faces of the grooves and will be elastically deformed to ensure an effective seal and a retention of the fins 6, 7 in the grooves 3, 4. It is apparent that the flexible connecting portion 8 merges into flanges 10, from which the fins 6, 7 extend. These flanges 10 facilitate the forcing of the fins 6, 7 into the grooves 4, 3 and in case of relatively large motions of the engine block 1 in the outer pan 2 may serve as buffer stops.

Figure 5:
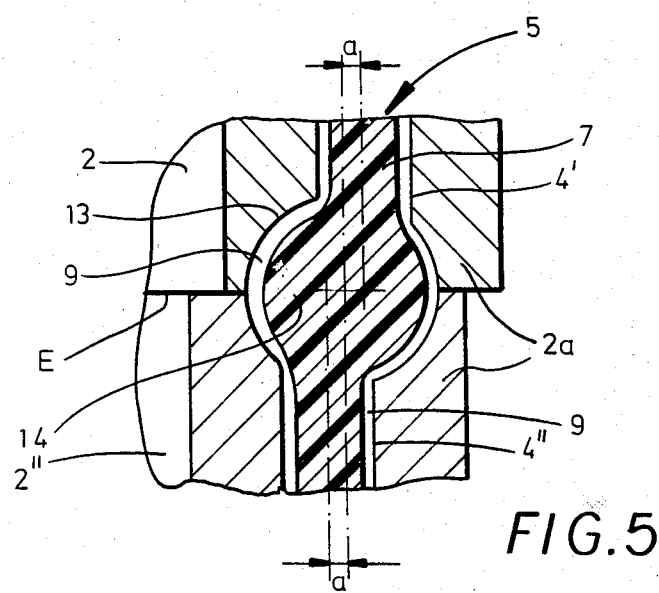
FIG. 5 is a sectional view taken on a plane disposed closely below the top rim of the pan and showing on an enlarged scale the joint between the sections of the pan and the inserted oil seal.

In accordance with FIGS. 4 and 5 the outer pan 2 consists of two cast one-half sections 2', 2", which are joined in a vertical parting plane E. Each of these sections 2', 2" is inherently cast with the corresponding portion of the groove 4 in the top edge portion of the pan. When the pan sections 2', 2" are being assembled, the portions of the groove 4 may be aligned only on one side of the pan but may be offset on the other side, as is shown on the right in FIG. 4. For this reason the pan sections are then formed with recesses, which in the assembled pan constitute a bore 13, by which the adjacent groove portions 4', 4" are enlarged in width. The axis of said bore 13 lies in the vertical parting plane E and is equally spaced from the center planes of the two groove portions 4', 4". The fin 7 of the oil seal 5 has a thickened cylindrical portion 14, which generally conforms to the bore 13 and is also formed with ribs 9. The thickened portion 14 is force-fitted in the bore 13 and acts virtually like a hinge, by which the offset of the grooves 4', 4" is taken up so that it cannot adversely affect the sealing action. It will be understood that the offset of the groove portions is exaggerated in FIGS. 4 and 5.

What is claimed is:

1. In a reciprocating internal combustion engine comprising an outer pan having a peripherally extending, annular top edge portion formed with a peripherally extending first annular groove having confronting side faces, an engine block mounted in said outer pan and formed in its outside peripheral surface with a peripherally extending second annular groove having confronting side faces, and a flexible frame-shaped oil seal surrounding said engine block and extending into said first and second annular grooves in sealing contact with said side faces, the improvement residing in that said oil seal comprises first and second fins extending into said first and second grooves, respectively, throughout the length thereof and a frame-shaped flexible profiled connecting portion, which connects said fins throughout the length thereof and has in cross-section an outwardly convex portion, which protrudes laterally outwardly above said top edge portion, each of said fins has side faces formed with a plurality of transversely deflectable, longitudinal ribs in sealing contact with said side faces of the associated one of said grooves, the thickness of each of said fins, inclusive of said ribs, in an unstressed condition exceeds the width of the associated groove, and the thickness of said flexible connecting portion is smaller than the thickness of each of said fins.

2. The improvement set forth in claim 1 as applied to an engine in which said engine block comprises members consisting of cylinders, cylinder heads, pistons, connecting rods and a crankshaft, and bearings for said members.

3. The improvement set forth in claim 1 wherein said flexible connecting portion is provided with first and second flanges and said first and second fins extend from said first and second flanges, respectively.

4. The improvement set forth in claim 1, as applied to engines in which said outer pan consists of first and second cast pan sections joined along a vertical parting plane and said first groove consists of first and second groove portions formed in said first and second pan sections, respectively, and laterally offset at said parting plane, wherein said first and second pan sections are formed with first and second recesses, which face said parting plane and constitute laterally enlarged portions of said first and second groove portions and together form a bore having a center line disposed in said parting plane and equally spaced from the center planes of said laterally spaced apart groove portions and said first fin has a thickened cylindrical portion force-fitted in said bore.

5. The improvement set forth in claim 4, wherein said thickened cylindrical portion is formed with ribs in sealing contact with said first and second pan sections in said bore.

6. The improvement set forth in claim 1 as applied to an engine in which said engine block is mounted in said outer pan by means preventing a transmission of structural sound from said engine block to said outer pan.

* * * * *